April 30, 1963 C. H. WERTH 3,087,737
DIAPHRAGM TYPE CHUCK

Filed Sept. 7, 1961 4 Sheets-Sheet 1

INVENTOR.
CARL H. WERTH

ATTORNEYS

April 30, 1963 C. H. WERTH 3,087,737
DIAPHRAGM TYPE CHUCK

Filed Sept. 7, 1961 4 Sheets-Sheet 2

*INVENTOR.*
CARL H. WERTH
BY
*Fearman, Fearman & McCulloch*
ATTORNEYS

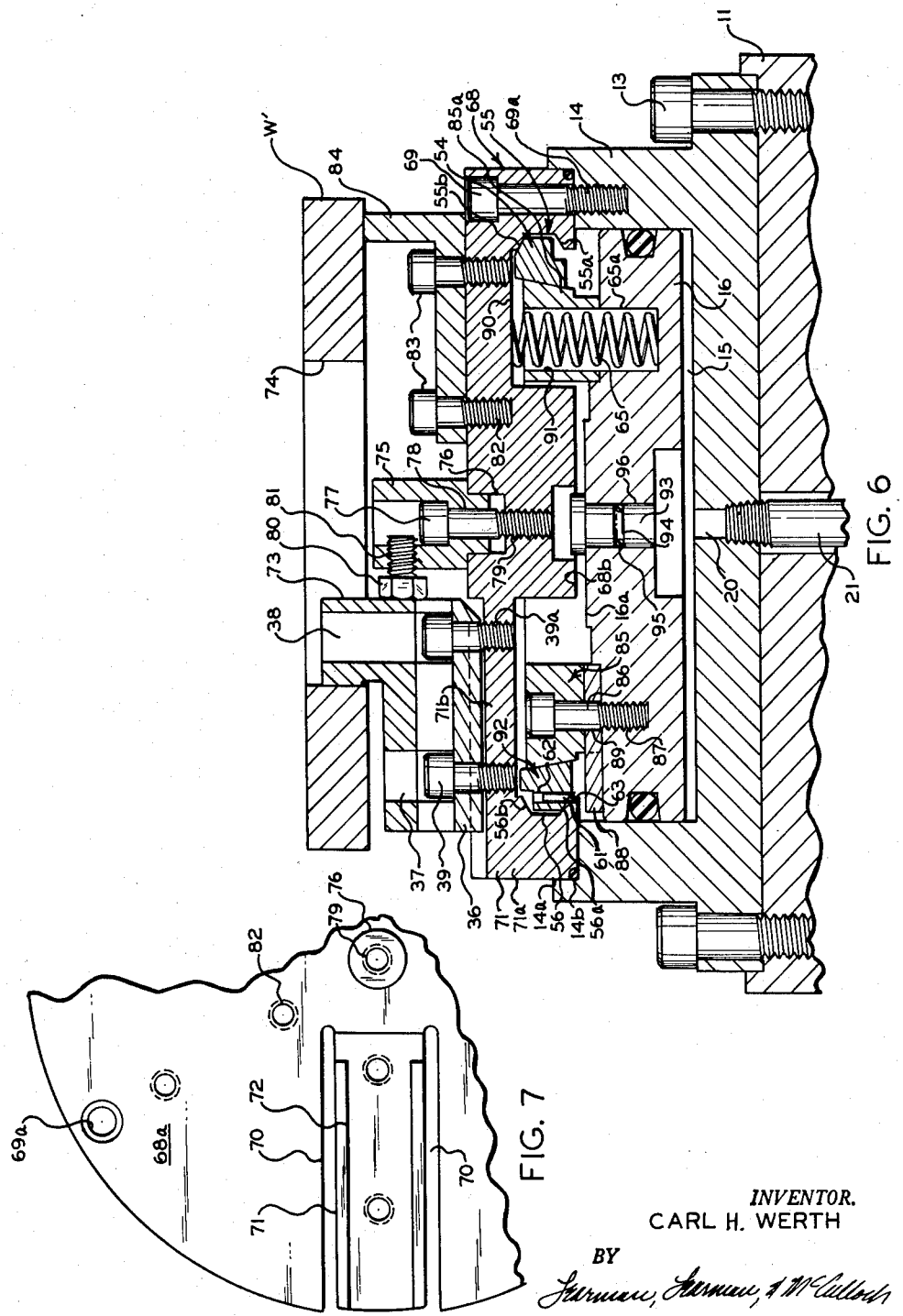

April 30, 1963 C. H. WERTH 3,087,737
DIAPHRAGM TYPE CHUCK
Filed Sept. 7, 1961 4 Sheets-Sheet 4

INVENTOR.
CARL H. WERTH
BY
ATTORNEYS

United States Patent Office 3,087,737
Patented Apr. 30, 1963

3,087,737
DIAPHRAGM TYPE CHUCK
Carl H. Werth, Saginaw, Mich.
Filed Sept. 7, 1961, Ser. No. 136,568
21 Claims. (Cl. 279—4)

This invention relates to diaphragm type chucks and certain highly useful improvements therein. Briefly, the invention is concerned with providing a series of circumferentially spaced apart, radially extending diaphragm spring fingers on which the chuck work receiving jaws are mounted. These fingers can accordingly be separated by relatively large, non-deflectable, stationary diaphragm surfaces on which a wide variety of work stop members may be secured in the desired position. The invention contemplates the employment of means such as a wedge or collet assembly for releasably locking the deflectable spring fingers when the workpiece is gripped by the chuck jaws. Further, the invention is concerned with a wedge assembly for releasably securing the workpiece receiving jaws to the diaphragm spring fingers.

One of the prime objects of the present invention is to provide a diaphragm type chuck of increased range. It is well known that the opening and closing movements of chucks of this type are relatively small, so that the principal use of diaphragm chucks is for holding large numbers of workpieces of substantially the same size in mass production machining operations. Sometimes the extent of opening movement of a chuck is responsible for restricting the tolerances on a part to be machined. For instance, whereas the normal allowable tolerance on a particular "clean up" operation is ±.010", in a particular situation the tolerance might have to be held to .002" so that the part will fit the chuck which is to hold it for a subsequent operation. The chuck of the present invention is designed to provide more jaw opening movement than chucks presently available. Accordingly, the present chuck is capable of chucking parts having diameters that vary considerably from a precision standpoint, such as die castings.

A further object of the invention is to provide a chuck having jaws which grip independently, in the sense that they are independently displaceable. Such jaws will grip the rougher workpieces in a more efficient manner, since the jaws can compensate for irregularities in chucking surfaces. Further, independently displaceable jaws will have less tendency to round up thin walled or fragile, out-of-round parts in gripping them for the machining operation. This is an important advantage since the part, if distorted, will tend to resume its original shape when unchucked, sometimes distorting the surfaces just machined.

A further object of the invention is to provide a chuck which is well suited to holding relatively fragile workpieces with light gripping pressures even though the workpieces are to be revolved at high speeds. The present chuck is designed to provide an adjustable gripping pressure which can be regulated as desired.

Another object of the invention is to provide a chuck of the character described which incorporates locking means for coupling the chuck jaws when a workpiece is gripped between them, so that centrifugal forces do not tend to move the chuck jaws away from the workpiece, and counterweight members to compensate for centrifugal forces can be eliminated. This is particularly important at times when only very light gripping pressures can be exerted by the chuck jaws.

A further object of the invention is to provide a diaphragm chuck in which no master jaws need be employed and releasable work holding false jaws are secured to deflectable diaphragm areas by wedging means which exerts a force in a direction to urge the jaws toward the diaphragm surfaces.

Still another object of the invention is to provide a chuck of the character mentioned which can be economically manufactured and assembled, which is of highly reliable and extremely durable design, and which will be suitable for use in all situations where diaphragm chucks are now used and in some instances where so-called radially adjustable, three-jaw chucks are presently used to take heavier cuts.

In the drawings,

FIGURE 6 is a diametral, sectional view illustrating an internal chuck formed in accordance with the invention;

FIGURE 7 is a fragmentary, top plan view of the diaphragm member of the embodiment shown in FIGURE 6 only.

Figure 1:
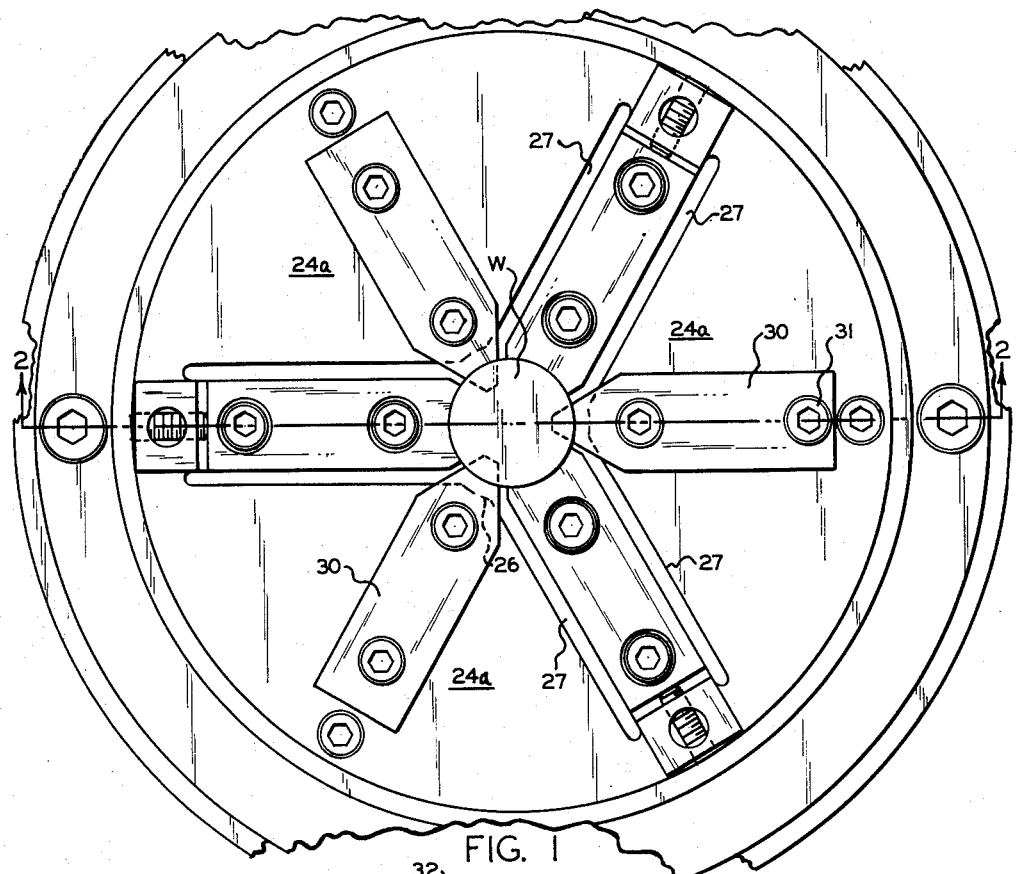
FIGURE 1 is a top plan view of an external chuck constructed in accordance with the present invention with a workpiece shown clamped in position by the chuck jaws.
Figure 2:
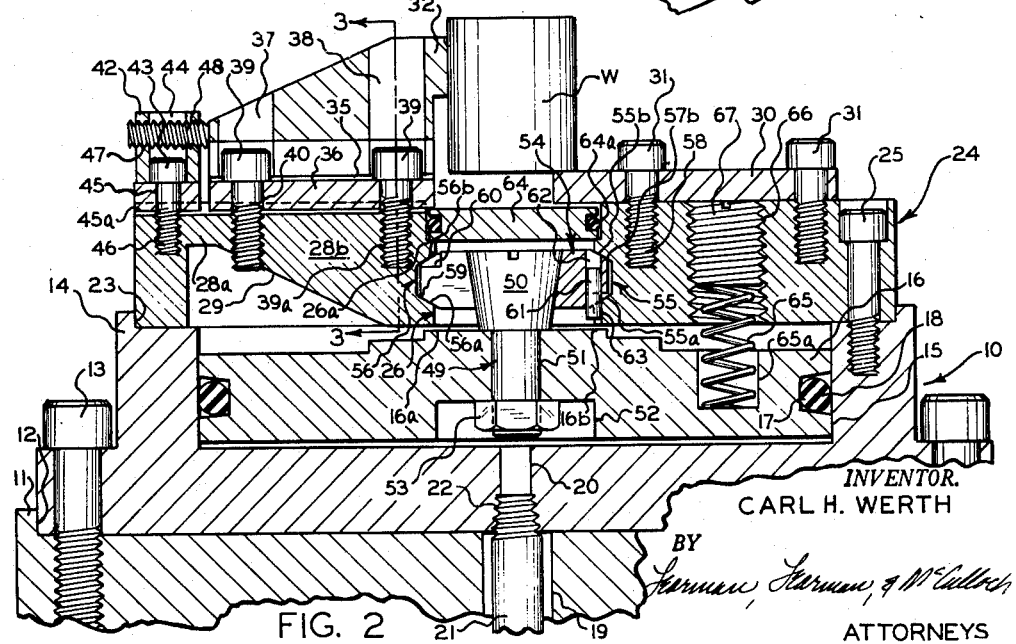
FIGURE 2 is a transverse, sectional view taken on the line 2—2 of FIGURE 1.

Referring now more particularly to the accompanying drawings and, in the first instance, to FIGURES 1–5 thereof, a mounting plate or member 10 is piloted upon the outer end of a machine tool spindle 11 which is annularly recessed as at 12 to receive it, and which is secured by means such as socket head cap screws 13. The mounting member 10 includes an axially forwardly or upwardly projecting flange or wall 14 which defines a cylinder chamber 15 concentric with the axis of the machine tool spindle 11. Provided in the cylinder chamber 15 is a piston member 16 which is peripherally recessed as at 17 to receive an O-ring seal 18 and has a top boss portion 16a. Passages 19 and 20 are bored through the spindle 19 and base or mounting member 14 as shown in FIGURE 2 and an air delivery tube 21 threads into the inner portion of bore 20 as shown to deliver and exhaust air to and from the chamber 15 to actuate piston 16 in a manner to be presently described.

It will be observed that the axially outer face of wall 14 is recessed as at 23 to receive a diaphragm plate generally designated 24 which is secured to the mounting member 14 in axially concentric relation with the spindle 11 by means such as socket head cap screws 25. Provided in the plate 24 in FIGURES 1 and 2 is a central opening generally indicated at 26, from which lead circumferentially spaced pairs of spaced apart slots or grooves 27 (see FIGURES 1 and 4) which terminate short of the peripheral edge of the plate 24 so that they define individual spring fingers generally designated 28. Three pairs of slots 27 flanking and defining three spring finger diaphragm portions 28 are shown in the drawings for the sake of convenience of illustration, but it is to be understood that the invention is not to be limited in any way to the number of spring finger portions 28 which are shown. As shown in FIGURE 2, the axially inner faces of spring fingers 28 are cut away as at 29 to define a reduced thickness, hinge portion 28a and a jaw mounting area 28b.

The areas 24a between the pairs of slots 27 form an axially stationary stop surface which can function to position the workpiece axially in the chuck. While the surface 24a could function in this manner for workpieces having a flange on their axially inner ends, preferably workpiece locator or stop plates 30 are releasably fixed in position on the surfaces 24a between pairs of slots 27 by socket head cap screws 31 or the like.

Figure 3:
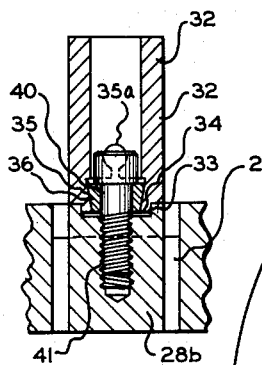
FIGURE 3 is a sectional, elevational view taken on the line 3—3 of FIGURE 2.
Figure 4:
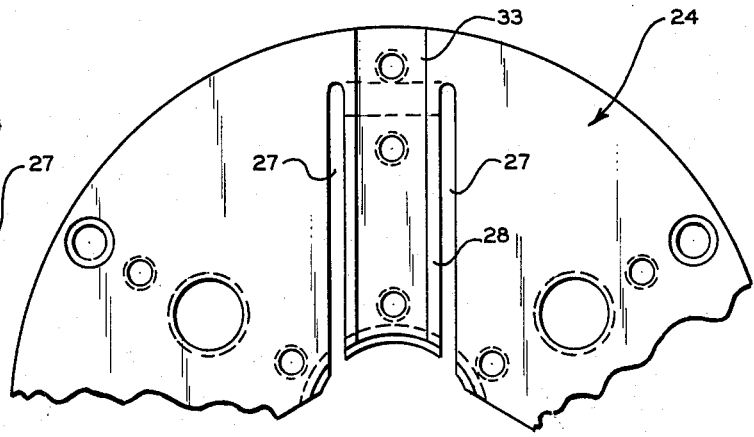
FIGURE 4 is a fragmentary, top plan view of the diaphragm plate only.
Figure 5:
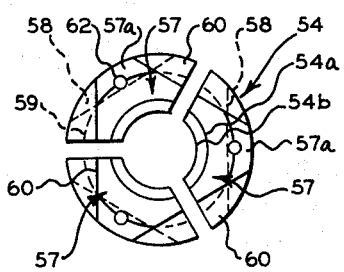
FIGURE 5 is a top plan view of the collet assembly employed for coupling the chuck jaw members to prevent centrifugal forces from moving them away from the workpiece when the chuck is revolved at high speeds.

It is essential, when heavy cuts are to be taken in a workpiece, to provide workpiece receiving jaws which are immovably fixed to the spring finger portions 28. In FIGURES 2 and 3, work receiving false jaws, generally indicated by the numeral 32, are shown fixed on the spring fingers 28 in a manner to impose forces in a direction to hold them down on the spring fingers 28. Each of the spring fingers is grooved as at 33 to receive a projecting portion 34 on the base of each of the false jaws 32, as shown, the lower portions 34 of the jaws 32 each being formed with a dove-tailed groove 35 from end to end thereof which receives a wedge bar 36. Keyhole slots 35a are provided in conjunction with grooves 35 as shown. Vertical openings 37 and 38 provide access openings to socket head cap screws 39 which extend through openings 40 provided in the wedge bars 36 and are threaded as at 41 into threaded openings 39a in the portions 28b of the spring fingers 28. At the radially outer ends of grooves 33, jaw stops 42 are similarly secured. Socket head cap screws 43 extend through openings 44 in the jaw stops 42 and openings 45 in wedge bars 45a, and are threaded as at 46 into the outer peripheral edge of the diaphragm plate 24. The jaw stops 42 are provided with radially extending threaded bores 47 receiving stop screws 48 in the usual manner. As the cap screws 39 and 43 are tightened down, the wedge blocks 36 and 45a are forced downwardly, thus forcing the shouldered base sections 34 of the jaws and corresponding base sections of the stops 42 downwardly as well as outwardly. In this manner the jaws 32 are force biased toward the diaphragm plate 24 and securely locked in position at all times.

In order to spread the jaws 32 sufficiently to permit loading and unloading of workpieces, a draw bar generally indicated at 49 is provided which has a frusto-conical shaped axially outer end portion 50 and, as shown in FIGURE 2, the actuator 49 is received in an opening 51 provided through piston 16 which has a counterbored portion 52 to receive the nut 53 which is threaded on the inner end of draw bar 49 and locks it to the piston 16. Axially slideably mounted on the wedge portion 50 of the draw bar 49 is a wedge device or assembly generally designated 54 which is received within a groove comprised of groove portions generally designated 55 formed in the diaphragm portions 24a and groove portions generally designated 56 formed in the spring finger portions 28. As shown in FIGURE 2, the maximum diameter of the assembly 54 is slightly less than the maximum diameter of the groove formed to provide an operating clearance 56 therebetween. The assembly 54 has a tapering bore complemental to section 50 of drawbar 49 which extends between edges 54a and 54b of maximum and minimum diameter respectively.

The grooves 55 include sloped, axially inner walls 55a and oppositely sloped, axially outer walls 55b, and the grooves 56 include sloped axially inner walls 56a and outer walls 56b. The wedge assembly 54 includes segments generally designated 57 having inwardly sloped surfaces 57a (see FIGURES 2 and 5) complementally aligned to the walls 55b of the grooves 55 in diaphragm portions 24a, the under portions of the segments 57 being cut away as at 58 to permit some axial movement of the segments 57 relative to diaphragm portions 24a. Segments 57 also include axially inner, outwardly sloping surfaces 59 which are complementally inclined to the surfaces 56a of the grooves 56 in the spring finger portions 28 of the diaphragm plate 24. The axially outer faces of the segments 57 are cut away as at 60 to permit some axial movement of the spring finger portions 28 in grooves 56. Pins 61 provided in openings 62 within the segment portions 57 and grooves 63 in diaphragm plate areas 24a prevent rotation of the expandable wedge assembly 54.

A seal plate 64 is provided to rest on a shoulder 26a provided within opening 26 and includes a projecting O-ring 64a to keep chips out of the operating mechanism. Formed in the boss portion 16a of piston 16 is a stop recess 16b serving as a piston safety stop. Piston return springs 65 are provided within piston openings 65a and extend up into threaded openings 66 provided in the diaphragm portions 24a. Screws 67 adjustable in the threaded openings 66 can be adjusted to vary the forces exerted by springs 64 which tend to push the piston 16 downwardly and operate to return the piston 16 when air is exhausted from the inner side of cylinder chamber 15.

In FIGURES 1 and 2 the workpiece W is shown securely clamped in position by the false jaws 32. Air has been exhausted from the inner or lower face of piston 16, and springs 64 operate to push the piston 16 downwardly. This causes frusto-conical portion 50 of draw bar 49 to pull downwardly and force segments 57 into locked engagement with the surfaces 55b of the diaphragm plate sections 24a and the surfaces 56a of the spring fingers 28, and thus tend to exert a chucking pressure on the workpiece W. The chucking pressure can be varied according to the pre-load placed on springs 64 by the screw members 67. When it is desired to release the workpiece W and reload another, air under pressure is supplied through pipe 21 to the under face of piston 16 and piston 16 is advanced upwardly and thereby moves wedge portion 50 of draw bar 49 upwardly to release the segments 57 from locked engagement. The boss portion 16a of the piston 16 then engages the spring fingers 28 and pivots the jaws 32 outwardly about the reduced diaphragm portions 28a to release the workpiece W, which then can be removed.

When a new workpiece has been reloaded, it is a simple matter to permit exhaustion of the air from the under side of piston 16 through pipe 21, and springs 65 then return the piston 16 to "down" position, wedge portion 50 expanding the segments 57 during the final portion of the piston's travel, to lock the inclined surfaces 59, 56a and 55b, 57b. If desired to actuate drawbar 49 mechanically, a reciprocable link could, of course, be connected directly to drawbar 49. With a chuck of the present design, wherein individual spring fingers are employed, a much greater opening of the jaws 32 is possible, thus providing a chuck of considerably greater capacity. For instance, whereas six inch chucks of which applicant is aware have an opening range of .012", applicant's range is .030". Further, the jaws grip independently and the springs 65 can be set to apply a soft grip to fragile workpieces or to provide heavy chucking pressures which would permit a relatively heavy removal of stock. The areas 24a are unobstructed and the stops can be provided in a variety of shapes as desired because the stops can be mounted anywhere on surfaces 24a.

Many commercially available chucks utilize counterweights to overcome centrifugal forces which are generated by high speeds of rotation. However, such designs are not satisfactory for all-purpose chucks because a proper mass cannot be provided to suit all speeds and all jaw configurations in use. The present system obviates the necessity of providing counterweights.

Many commercially available chucks have master jaws which are brazed to or bolt on the diaphragm and tend to creep or work loose during use. The instant chuck assemblies incorporate securely locked, releasable jaws and have a low overall height which permits the workpieces to be gripped close to the spindle and minimizes errors occurring because of chatter. Because portions 28a are in the form of beams the allowable deflection can be easily calculated.

The internal chuck which will now be described possesses the same advantages. It is to be understood that this chuck is patterned after the external chuck and, where possible, similar numerals will be used to identify similar parts. The machine tool spindle is again identified by the numeral 11 and cap screws 13 secure the mounting member 14 in the same manner. Piston 16 is mounted in the cylinder chamber 15 and an air pipe 21 again furnishes air under pressure through an opening 20 in the under side of piston 16.

A diaphragm plate generally designated 68 is secured to the mounting member 14 by socket head cap screws 69 threading into openings 69a, and includes a series of circumferentially spaced pairs of spaced apart slots or grooves 70 which lead from the periphery of the diaphragm plate 68 radially inwardly, as shown in FIGURE 7, to define deflectable diaphragm spring sections 71 separated by axially stationary diaphragm stop surfaces 68a as before. Clearance is provided at 14a between the spring fingers 71 and wall 14 to permit deflection of sections 71 and an O-ring seal 14b is used at this point as shown. Grooves 72 in the spring portions 71 are provided to accommodate the work receiving false jaw members 73 which, as indicated in FIGURE 6, are adapted to engage the interior diameter 74 of a workpiece W'. The jaws 73 are formed with base sections in the manner of jaws 32 (see FIGURES 2 and 3) and are held in place by cap screws 39 extending through openings 37 and 38 and threaded into openings 39a in the diaphragm plate 68 to actuate a locking wedge bar 36, as before. A central stop screw holder 75 is received in opening 76 provided centrally in the axially outer face of diaphragm plate 68, as shown, and a socket head cap screw 77 extending through a reduced size opening 78 in the tubular member 75 is threaded into an opening 79 in the diaphragm plate 68 to secure the holder 75 in position. Lateral stops 80 are adjustably provided in threaded openings 81 extending radially through the holder 75 in radial alignment with the jaws 73.

In the spaces 68a, between pairs of slots 70, threaded openings 82 are provided which permit socket head cap screws 83 to mount work support stops 84. While FIGURE 7 in only a fragmentary plan view, it may be assumed that three equidistantly spaced jaws 73 and stops 84 are provided as previously, although, of course, I do not intend that the invention should be restricted to any particular number of jaws or stops.

Fixed on the axially outer face of diaphragm 16 is a draw sleeve, generally identified by the numeral 85, which is secured in place by socket head cap screws 86 extending into threaded openings 87 provided in the piston 16 and serving to anchor lift bars 88 as well, which have openings 89 to pass the screws 86 and extend radially a sufficient distance to underlie radially outermost sections 71a of the diaphragm spring fingers 71. Sections 71a are formed when the spring portions 71 are cut away on their under sides to provide sections 71b of reduced thickness which permit the sections 71a to be deflected upwardly when engaged by the plates 88.

The areas 68a of the diaphragm plate are also cut away to provide a seating surface 90 for the piston return springs 65 which are similarly accommodated in bores 65a provided in the piston 16, but in this version of the invention extend through openings 91 provided in the draw sleeve 85. The drawbar sleeve 85 similarly has a frusto-conical portion 85a on which the expandable wedge assembly generally designated 54 is provided which, as before, includes segments 57. The diaphragm plate areas 68a are similarly formed with grooves 55 including surfaces 55a and 55b, and the spring finger portions 71 of the diaphragm 68 are formed with grooves 56, as before, including inclined surfaces 56a and 56b. Pins 61 seated in openings 62 in the wedge segments 57, which extend also into openings 63 in the diaphragm plate 68, prevent rotation of the segments 57 with respect to the diaphragm plate 68. Provided in the piston 16 is a plug 93, including a groove 94 for an O-ring 95, the plug seating in an opening 96 provided in piston 16. Surfaces 68b and 16a function as piston safety stop surfaces.

In operation, the internal chuck functions exactly like the external chuck previously described except that the gripping jaws 73 move inwardly away from the bore 74, rather than outwardly away from an exterior surface as previously. In a gripping position the force of springs 64 maintains the piston 16 in the lower position shown and at this time wedge assembly 54 is in expanded position and is locked against the surfaces 55b and 56a, so that centrifugal forces will have no effect upon the chucking pressure exerted by the jaws 73. When air under pressure is supplied through pipe 21 to the under face of piston 16 and the piston is moved upwardly, drawbar ring 85 moves upwardly and permits the release of segments 57. Shortly thereafter, plates 88 engage the portions 71a of diaphragm plate 68 and move them upwardly about the radially inner sections of portions 71b as pivots. The jaws 73 of course pivot inwardly with the spring finger portions 71 to release the workpiece W' and permit another one to be mounted in position atop the work stop supports 84. When air is exhausted from the chamber 15 through pipe 21, the springs 64 return the piston 16 to lowered position and the wedge assembly 54 locks the spring finger portions 71 and stop surface portions 68a. It will be noted that the present internal chuck furnishes a pull-back action to pull the workpiece firmly against the stops and releases by pushing, rather than pulling as do many of the internal chucks on the market, so no problems arise with holding the workpiece on the work stops or locators.

Figure 8:
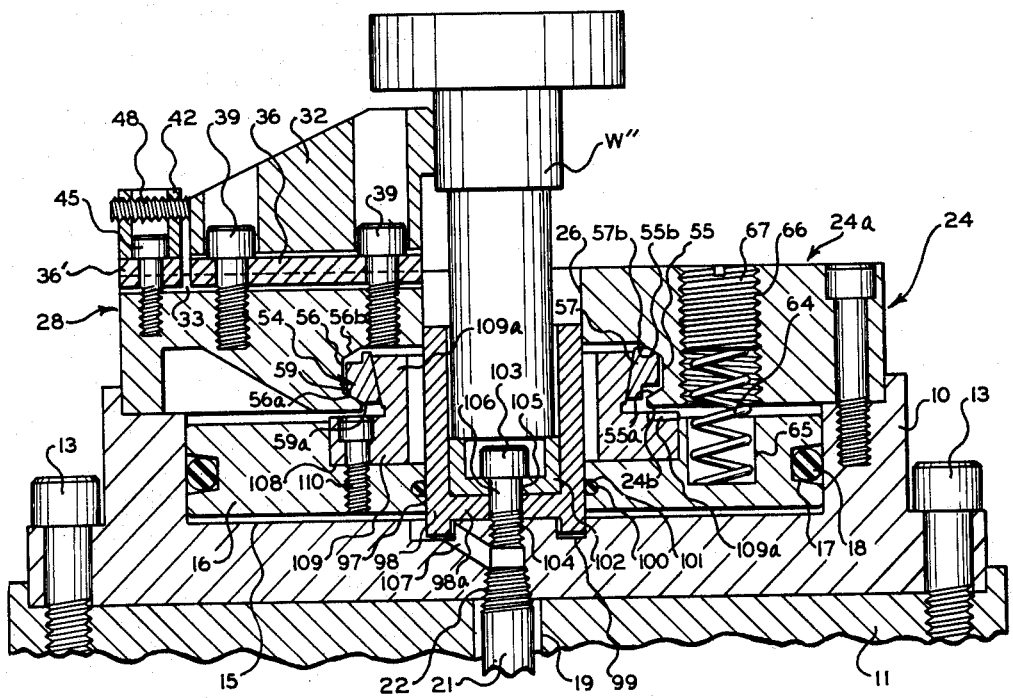
FIGURE 8 is a diametral, sectional view illustrating a modified embodiment of the external chuck which is particularly suited to checking relatively elongated workpieces.

In FIGURE 8 a still further embodiment of the invention is shown which is particularly designed for handling relatively elongate workpieces W". Again, in describing this modification of the invention, the same numbers used previously to describe identical or similar parts will be used. This embodiment of the invention is most similar to that disclosed in FIGURES 1–4 and likewise includes machine tool spindle 11, mounting member 10, and diaphragm plate 24 with spring finger portions 28 and stop surface portions 24a. Mounted on the spring finger portions 28 are false jaws 32 secured by cap screws 39 which bias a wedge bar 36 in a direction to move the base portion of the jaws downwardly into spring finger portion jaw receiving grooves 33. Jaw stops 42 with adjustable screws 48 are similarly anchored in position by cap screws 45, securing wedges 45a.

The piston generally designated 16 provided in chamber 15 has, in this instance, a central bore 97 passing a sleeve member 98 which at its ends extends into the central opening 26 provided in the diaphragm plate 24 and into an annular groove 99 provided in the mounting member 10. Piston 16 is grooved as at 100 to accommodate an O-ring seal 101 and also, as at 17, to receive the O-ring seal 18, as previously. Mounted within sleeve 98 on a transverse wall 98a thereof is a cup-shaped work stop or support 102, and cap screw 103 which threads into a threaded opening 104 in the mounting member 10 extends through openings 105 in the stop member 102 and 106 in the sleeve member 97.

Pipe 21 extending through opening 19 in the machine tool spindle 11 and threaded into the mounting member 10 at 22 delivers air through the lower portion of passage 104 to the groove 99 via passages 107 which are open, as shown in FIGURE 8, to the chamber 15 below piston 16. Piston 16 is recessed as at 108 to receive the drawbar ring 109 anchored by cap screws 110 to piston 16, and mounted on the axially tapering projections 109a of drawbar member 109 is a wedge assembly 54, as previously. Grooves 55 and 56 are again provided in the stop portions 24a of diaphragm plate 24 and spring fingers 28, respectively, to receive the segments 57. Grooves 55 have surfaces 55a and 55b, as previously, and grooves 56 have surfaces 56a and 56b. The corresponding locking surfaces on segments 57 are again 57b, and on spring finger portions are 59. Return springs 64, received in piston openings 65 and threaded openings 66, of the diaphragm plate 24 are again preloaded, as desired, by screw members 67.

While not shown in FIGURE 8, it is to be understood that the diaphragm 24, as previously, is made up of sections 24a spaced by pairs of spaced apart slots or grooves 27 which define spring fingers 28. Thus, the plan view in FIGURE 1 of the external chuck disclosed in FIGURES 1–4 would also be a plan view of the chuck disclosed in FIGURE 8, except that no work stops 30 are provided on the sections 24a and the threaded bores 66 and screw members 67 would be visible. In this embodiment of the invention the stops 30 are replaced by the sleeves 97 and work supports 102 which anchor to the mounting member 10. Piston safety stop surfaces are at 109a and 24b. The operation of the chuck is, of course, identical.

It should be apparent that I have perfected a chuck which is extremely practical for handling workpieces of diverse size and shape, from a diaphragm chuck standpoint with a variable chucking pressure dependent on the fragility of the workpieces held and the heaviness of the cuts to be taken.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

What is claimed is:

1. In a diaphragm type chuck having a mounting member and a plurality of circumferentially spaced work receiving jaws; the combination with said member and jaws of a diaphragm portion connected therebetween and having a pair of generally radially extending, parallel grooves straddling and generally paralleling each jaw such that said jaws are deflectable axially while the area between said grooves remains substantially stationary to serve as a work stop surface.

2. In a diaphragm type chuck having a mounting member with a diaphragm plate thereon; circumferentially spaced work holding jaws fixed on said plate; said jaws being flanked by slots through said plate generally paralleling said jaws and permitting said jaws to flex axially individually; and work stop means mounted on the axially stationary plate surface between said jaws.

3. In a diaphragm type chuck; diaphragm means; circumferentially spaced, work receiving, axially deflectable jaws thereon extending axially outward of said diaphragm means; means fixing said jaws to said diaphragm means; means for releasably coupling said jaws to overcome centrifugal forces acting on the jaws individually when a workpiece is received by the jaws; and means operative for coupling and uncoupling said jaws.

4. The combination defined in claim 3 including means for axially deflecting said jaws.

5. In a diaphragm type chuck; mounting member means forming a plurality of circumferentially spaced, generally radially extending spring fingers fixed at one end and free to deflect generally axially at their other ends carried by said mounting member; work receiving jaws on said fingers axially outward thereof; said mounting member means having substantially axially stationary stop surface area between said jaws.

6. The combination defined in claim 5 including means for axially deflecting and releasing said spring fingers to grip and release a workpiece.

7. The combination defined in claim 6 in which means is provided for coupling and uncoupling said jaws when said spring fingers grip and release a workpiece respectively to prevent centrifugal forces from deflecting said jaws.

8. In a diaphragm type chuck; mounting base means; means forming a plurality of spaced apart spring fingers fixed at one end and free to deflect axially at their other ends carried by said mounting base means; work receiving jaws on said fingers axially outward thereof; means for coupling and uncoupling the free ends of the spring fingers to the mounting base means when a workpiece is received by the jaws; and means operative for coupling and uncoupling said spring fingers to prevent centrifugal forces from deflecting said jaws.

9. In a diaphragm type chuck; mounting base means; a plurality of individually axially deflectable, circumferentially spaced, generally radially extending jaws carried thereby; and wedge means expandable to connect said jaws to overcome centrifugal forces acting on the jaws individually when a workpiece is received by the jaws.

10. In a diaphragm type chuck; mounting member means; means forming a plurality of spring fingers fixed at one end by said mounting member and free to deflect axially at their other ends separated by substantially axially stationary surfaces; work receiving jaws on said fingers; wedge segments including portions expandable into engagement with said spring fingers and portions expandable into engagement with said surfaces to prevent centrifugal forces from deflecting said jaws when a workpiece is received between them; and drawbar means for expanding and releasing said wedge means.

11. In a diaphragm type chuck; a mounting member; means forming a plurality of axially deflectable areas carried by said mounting member; circumferentially spaced, generally radially extending work receiving jaws releasably mounted on said areas; said means and jaws having a projection and slot connection; and releasable wedge means for rigidly maintaining said jaws in position on said areas.

12. In a diaphragm type chuck; a mounting member; work receiving jaws; diaphragm means interposed between said member and jaws; a plurality of circumferentially spaced, generally radially extending grooves provided in said diaphragm means; said jaws having projecting base portions received in said grooves with recesses therein; and releasable wedge bars in said recesses for locking said base portions in said grooves.

13. In a diaphragm type chuck; a mounting cylinder having a chamber housing a piston therein; a diaphragm fixed on one end of said cylinder and forming an outer end wall therefor; said diaphragm being formed with a plurality of radially extending circumferentially spaced grooves in its outer surface; work receiving jaws mounted therein; slots through said diaphragm, flanking and parallel with said grooves on each side thereof, defining axially deflectable diaphragm spring fingers spaced by substantially axially stationary diaphragm stop surfaces; circumferentially spaced work stops mounted on said surfaces; an axially extending tapering member secured on said piston; a segmented locking member surrounding said tapering member and comprising circumferentially spaced separate segments, said segments having radially inner tapering faces corresponding with said tapering member; complementary wedge surfaces on the axially stationary surfaces and each of said segments; complementary wedge surfaces on the diaphragm spring fingers and each of said segments; preloaded spring means between said diaphragm stop surfaces and piston normally urging said piston and tapering member inwardly and said segments into locked engagement with said diaphragm spring fingers and diaphragm stop surfaces; a spring finger engaging surface on said piston spaced therefrom when the piston is in inner position a distance sufficient to allow disengagement of said segments prior to forcing opening movement of said jaws; and means leading to said piston permitting the introduction of fluid under pressure to the under side of said piston in opposition to said spring means for releasing said segments from locked engagement and causing said jaws to deflect axially sufficiently to provide loading clearance.

14. In a diaphragm type chuck; a mounting cylinder having a chamber housing a piston therein; a diaphragm fixed on one end of said cylinder and forming an outer end wall therefor; said diaphragm being formed with a plurality of radially extending, circumferentially spaced grooves in its outer surface; work receiving jaws mounted therein having reduced base portions with recesses in the base surfaces thereof extending from end to end thereof shaped to provide spreadable base legs with downwardly inclined wedge surfaces; a wedge bar having complementally inclined surfaces shaped to exert a downward and outward force on said base legs received in each recess; securing means for exerting a downward pressure on said wedge bars; slots through said diaphragm, flanking and parallel with said grooves on each side thereof, defining axially deflectable diaphragm spring fingers spaced by substantially axially stationary diaphragm stop surfaces; circumferentially spaced work stops mounted on said surfaces; an axially extending tapering member secured on said piston; segmented locking means including tapering surface surrounding said tapering member; complementary engaging surfaces on the said axially stationary diaphragm surfaces and segmented locking means; complementary engaging surfaces on the diaphragm spring fingers and segmented locking means; preloaded spring means between said diaphragm stop surfaces and piston normally urging said piston and tapering member downwardly and said segments into locked engagement with said diaphragm spring fingers and diaphragm stop surfaces; a spring finger engaging surface on said piston spaced therefrom when the piston is in inner position a distance sufficient to allow disengagement of said locking means prior to opening movement of said jaws; and means permitting the introduction of fluid under pressure to the under side of said piston in opposition to said spring means for releasing said segmented locking means from locked engagement and causing said jaws to deflect axially sufficiently to provide loading clearance.

15. In a diaphragm type chuck; a mounting member; work receiving jaws; diaphragm means interposed between said member and jaws; a plurality of circumferentially spaced, generally radially extending grooves provided in said diaphragm means; said jaws having projecting base portions received in said grooves with recesses in the base surfaces thereof shaped to provide deflectable base legs with inclined wedge surfaces; wedge bar means in said recesses having similar surfaces shaped when a downward force is applied to them to exert a downward force on said base legs; and means bearing on said wedge bar means for exerting a downward force thereon and locking said base portions in said grooves.

16. In a diaphragm type chuck; mounting base means; means forming a plurality of spaced apart diaphragm spring fingers fixed at one end and free to deflect axially at their other ends carried by said mounting base means; work receiving jaws on said fingers; means for coupling and uncoupling the free ends of the spring fingers to the mounting base means when a workpiece is received by the jaws; adjustably loadable spring means for urging said fingers in a direction to grip a workpiece; and means operative to actuate said means for coupling and uncoupling to prevent centrifugal forces from deflecting said jaws.

17. In a diaphragm type chuck having a mounting member and a plurality of circumferentially spaced work receiving jaws; the combination with said member and jaws of a diaphragm sandwiched therebetween and having a pair of generally radially extending, parallel grooves straddling and generally paralleling each jaw such that said jaws are individually deflectable axially while the area between said grooves remains substantially stationary to serve as a work stop surface; means displaceable to move the free ends of the jaws outwardly to release a workpiece; and adjustably loadable spring means extending from the said area between said grooves to the displaceable means urging said jaws to gripping position.

18. In a diaphragm type chuck having a mounting member, a diaphragm plate mounted thereon; circumferentially spaced, work holding jaws fixed on said plate; said jaws being flanked by slots through said plate generally paralleling said jaws leading from the periphery of said plate inwardly and permitting said jaws to flex axially individually; and stop means mounted on the axially stationary plate surface between said jaws.

19. In a diaphragm type chuck; a mounting member; diaphragm means forming a plurality of circumferentially spaced, generally radially extending spring fingers fixed at their inner ends and free to deflect axially at their outer ends carried by said mounting member; work receiving jaws on said fingers; said diaphragm means providing substantially axially stationary stop surface area between said jaws; locator stops on said stop surface area; a tubular jaw stop mount member carried centrally by said diaphragm means; and jaw stops extending radially from said latter member toward said jaws.

20. In a diaphragm type chuck; mounting member means forming a plurality of circumferentially spaced, generally radially extending spring fingers fixed at one end and free to deflect axially at their other ends carried by said mounting member; work receiving jaws on said fingers; and work support means carried centrally by said mounting member.

21. In a diaphragm type chuck; a mounting member; work receiving jaws; axially deflectable means interposed and secured between said member and jaws; and means, securing said jaws to said axially deflectable means, force biasing said jaws toward said axially deflectable means.

References Cited in the file of this patent

UNITED STATES PATENTS

| | | |
|---|---|---|
| 2,719,721 | Grobey | Oct. 4, 1955 |
| 2,741,481 | Ortegren | Apr. 10, 1956 |
| 2,778,649 | Klem | Jan. 22, 1957 |
| 2,832,601 | Mann | Apr. 29, 1958 |
| 3,006,653 | Benjamin | Oct. 31, 1961 |